United States Patent

Hasegawa et al.

[11] Patent Number: 6,106,717
[45] Date of Patent: Aug. 22, 2000

[54] METHOD FOR TREATING ORGANIC WASTE WATER

[75] Inventors: Susumu Hasegawa; Akira Akashi, both of Kobe, Japan

[73] Assignee: Shinko Pantec Co., Ltd., Hyogo, Japan

[21] Appl. No.: 09/184,722

[22] Filed: Nov. 2, 1998

[30] Foreign Application Priority Data

Jun. 15, 1998 [JP] Japan .................................. 10-167212

[51] Int. Cl.$^7$ ...................................................... C02F 3/02
[52] U.S. Cl. ...................... 210/607; 210/609; 210/623; 210/624; 210/626; 210/630; 210/790; 210/806; 210/906; 210/259
[58] Field of Search ................................. 210/605, 607, 210/609, 621, 623, 624, 626, 630, 790, 806, 906, 259

[56] References Cited

U.S. PATENT DOCUMENTS

| | | | |
|---|---|---|---|
| 4,042,493 | 8/1977 | Matsch et al. | 210/6 |
| 4,183,808 | 1/1980 | Drnevich | 210/5 |
| 4,460,470 | 7/1984 | Reimann | 210/605 |
| 4,956,094 | 9/1990 | Levin et al. | 210/625 |
| 5,601,719 | 2/1997 | Hawkins et al. | 210/605 |
| 5,611,927 | 3/1997 | Schmid | 210/605 |

FOREIGN PATENT DOCUMENTS

| | | | |
|---|---|---|---|
| 6-206088 | 7/1994 | Japan | C02F 3/12 |
| 9-10791 | 1/1997 | Japan | C02F 3/12 |
| 9-276887 | 10/1997 | Japan | C02F 3/12 |

OTHER PUBLICATIONS

*Sewage Service Project—Design Guide and Explanation,* vol. 2, pp. 131–136 (1994).

*Primary Examiner*—David A. Simmons
*Assistant Examiner*—Betsey J. Morrison
*Attorney, Agent, or Firm*—Marshall, O'Toole, Gerstein, Murray & Borun

[57] ABSTRACT

A method of treating an organic waste water, which is capable of separating and recovering phosphorus components in a liquid or solid form, is provided. According to the method of the present invention, reuse of phosphorus components can be facilitated, while the content of phosphorus components contained in a large quantity of a primary treated liquid can be reduced. The following steps are utilized in the method of the present invention: (1) an aeration step for aerobically treating a waste water; (2) a solid-liquid separation step for separating the waste water after the aeration into a primary treated liquid and a primary sludge; (3) a phosphorus component release step for releasing phosphorus components from the separated primary sludge to a liquid phase; and (4) a solid-liquid separation step for separating the primary sludge after releasing the phosphorus components into a secondary treated liquid containing the released phosphorus components and a secondary sludge essentially free from phosphorus components.

8 Claims, 4 Drawing Sheets

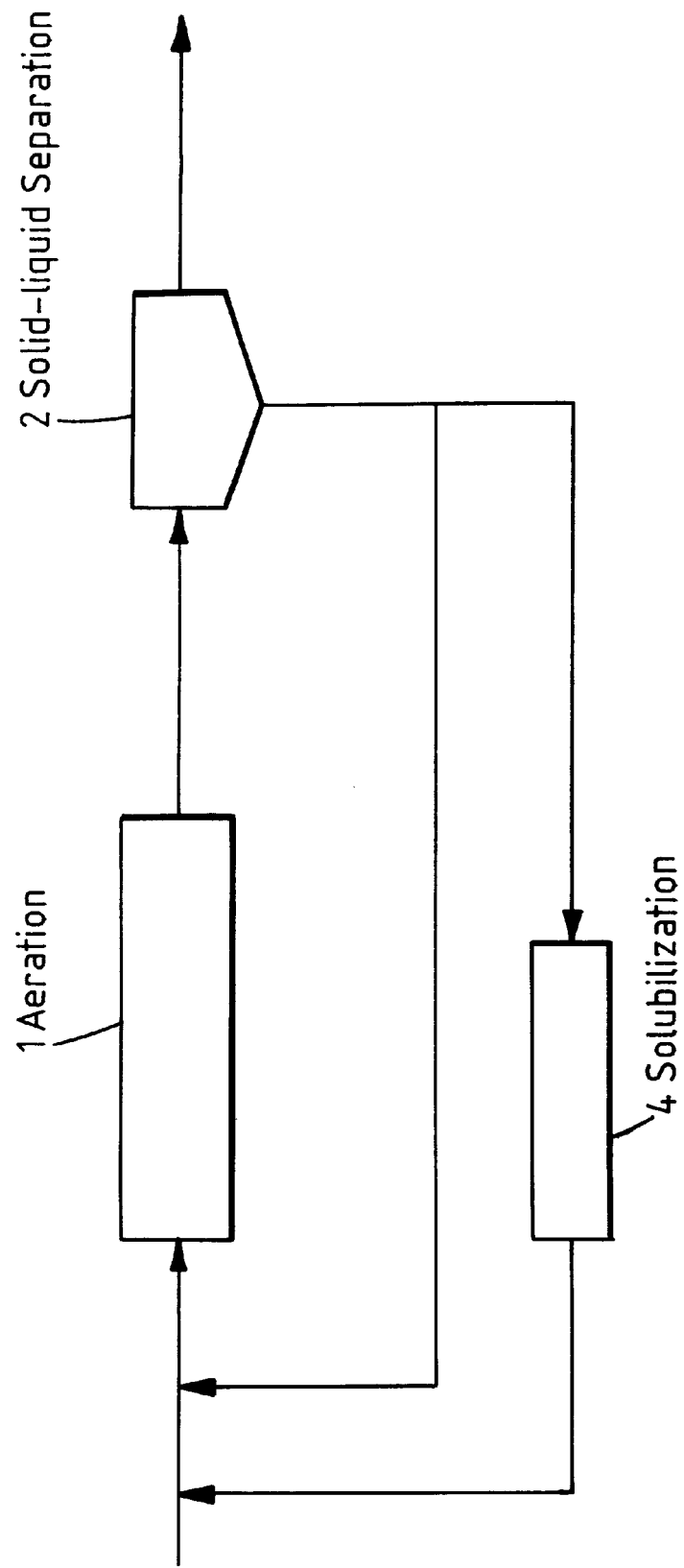
Fig. 4  PRIR ART

METHOD FOR TREATING ORGANIC WASTE WATER

FIELD OF THE INVENTION

The present invention relates to a method of treating an organic waste water discharged from a sewage treatment process of sewage treatment plant or a night soil treatment plant, as well as a waste water treatment process of an organic effluent from a food factory, chemical factory, or the like, to separate and recover phosphorus components present in the waste water.

BACKGROUND OF THE INVENTION

In methods of treating an organic waste water mentioned above, one extensively used method subjects a biomass sludge predominantly containing microbial cells, as well as an excess sludge containing an untreated residual sludge, to a solid-liquid separation using a precipitation tank or the like. These sludges have been produced by the biological digestion of the waste water. In this method, the resulting liquid portion obtained as a supernatant from such a separation process is appropriately discarded, and the excess sludge portion is disposed of at sea or in a landfill.

Applicant previously filed a patent application (Japanese Laid-Open Patent Publication No. 9-10791) directed to a method and an apparatus for treating an activated sludge comprising the steps of: (i) subjecting an organic waste water to an aeration treatment in an aeration device; (ii) solid-liquid separation into a treated liquid and a sludge; (iii) returning a portion of the separated sludge to the aeration device through a recycle route; (iv) heat-exchanging the excess sludge obtained from the solid-liquid separation step using a heat exchanger; (v) solubilizing the heated sludge at a high temperature in a solubilization device; and (vi) returning the solubilized solution to the aeration device through a return route. This patent application discloses an invention directed to a method and an apparatus for treating an activated sludge which is capable of drastically reducing the quantity of excess sludge produced. A schematic flow diagram for this method is shown in FIG. 4.

However, depending on the raw organic effluent that is treated, a large amount of phosphorus components (e.g., orthophosphoric acids, polyphosphoric acids, phosphate salts and their esters, phosphoproteins, glycerophosphoric acids, phospholipids, and the like) can remain in the treated liquid and the excess sludge by the method described above. Discarding such substances can directly result in environmental pollution. In particular, it is undesirable to discharge a treated liquid containing a large amount of such phosphorus components into lakes or ponds, which can cause a drastic growth of phytoplankton associated with the eutrophication of water. Therefore, a procedure used at times comprises adding a flocculant to the treated liquid obtained from the solid-liquid separation device in order to reduce the amount of the phosphorus components, followed by discharging the treated liquid. However, this method has disadvantages because subjecting a large amount of the treated liquid to such a flocculation process requires a large-scale device, thereby causing an increase in cost, time, labor, and the like, which is necessary to practice this method. Furthermore, flocculation efficiency is low, and removal of the phosphorus components at times is insufficient. Therefore, discarding an excess sludge without sufficiently removing the phosphorus components contained in the sludge is not desirable.

Meanwhile, conventional processes for removing phosphorus components from a waste water include, for example: (1) chemical flocculation method; (2) a crystallization dephosphorizing method; and (3) an anaerobic-aerobic activated sludge method (see, Sewage Service Project, Design Guide and Review, published by Japan Sewage Work Association, Vol. 2, pp.131–136, 1994).

In the chemical flocculation method, flocculants, such as aluminum sulfate, are mixed with a waste water to precipitate flocs of insoluble phosphate salts (including a floc of microorganisms). Precipitation is based on the fact that trivalent metal cations, such as aluminum ion and ferric ion, chemically react with orthophosphoric ions to form insoluble phosphate salts. According to this method, an increase of excess sludge of 5% to 20% has been reported. Therefore, in order to preserve the environment, it is not desirable to dispose of a large amount of excess sludge containing a large amount of phosphorus components.

The crystallization method is based on the production of an insoluble hydroxyapatite by a reaction between orthophosphoric ions and calcium ions. This method is preferred because an increase in excess sludge does not occur. However, it is necessary to strictly control the conditions required for crystallization of apatite (e.g., removal of crystallization inhibitor, such as carbonate ion, and pH adjustment, temperature adjustment, as pretreatments). Therefore, the applicability of this method is limited. Furthermore, because the method includes factors causing an increase in cost, it is not a preferred method of waste water treatment.

In the anaerobic-aerobic activated sludge method, an effluent is subjected to a repeated treatment in an anaerobic tank, an aerobic tank, and a precipitation tank. Thus, phosphorus components can be present in the excess sludge, and thereby the phosphorus components in the treated liquid can be reduced. This method is based on the phenomenon that microorganisms in the anaerobic state release polyphosphoric acid in the form of orthophosphoric acid, although microorganisms ingest and metabolize an excess amount of orthophosphoric acid in the aerobic state in order to accumulate orthophosphoric acid as polyphosphoric acid. According to this method, although the phosphorus components can be effectively removed from the treated liquid, the excess sludge is rich in phosphorus components and also contains various other organic components and heavy metal components. Therefore, discarding such an excess sludge caused problems. Furthermore, despite a possibility of effective uses of the phosphorus components present in the waste water, e.g., in the production of a fertilizer, phosphorus compounds, and the like, there are disadvantages in discarding the phosphorus components in the form of a sludge mixed with such heterogeneous components.

SUMMARY OF THE INVENTION

In view of problems associated with conventional waste water treatment processes, it is an object of the present invention to provide a method of treating an organic waste water which is capable of separating and recovering phosphorus components, as a liquid or solid, in the reduced volume. Accordingly, the reuse of the phosphorus components can be realized and the disadvantages resulting from discarding the phosphorus components present in a large volume of a primary treated liquid can be avoided.

BRIEF DESCRIPTION OF THE DRAWINGS

FIG. 4 is a schematic diagram showing a conventional method of treating an organic waste water.

DETAILED DESCRIPTION OF THE INVENTION

Figure 1:
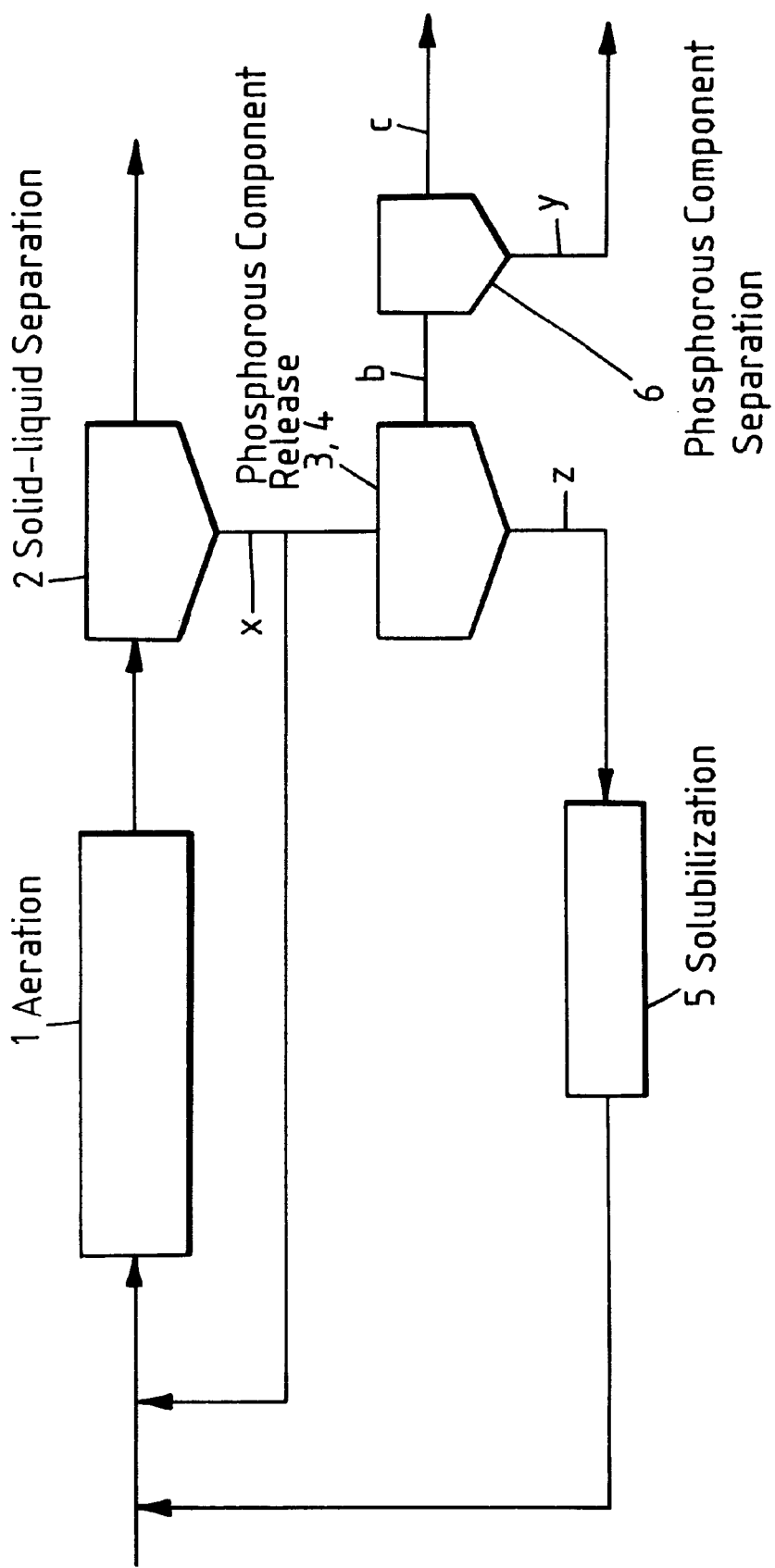
FIG. 1 is a schematic diagram showing an embodiment of the method of treating an organic waste water of the present invention.

As the first aspect of the present invention, a novel method of treating an organic waste water is provided, which comprises the steps of:

(1) an aeration step for aerobically treating a waste water;

(2) a solid-liquid separation step for separating the waste water after the aeration step into a primary treated liquid and a primary sludge;

(3) a phosphorus component release step for releasing phosphorus components from the separated primary sludge to a liquid phase; and (4) a second solid-liquid separation step for separating the primary sludge into a secondary treated liquid containing the released phosphorus components and a secondary sludge free of phosphorus components.

According to this method, the phosphorus components are incorporated and accumulated into microorganisms in step (1). Then the treated liquid from step (1) is separated in the following step (2) into the primary treated liquid and the primary sludge containing high concentration of phosphorus components. In the following step (3), the phosphorus components are released from the primary sludge into a liquid phase, followed by step (4), the second solid-liquid separation. As a result, a small volume of the treated liquid containing high concentration of phosphorus components (a secondary treated liquid) and the secondary sludge free of phosphorus components can be obtained.

As the second aspect of the present invention, the method according to the above-described method in connection with the first aspect of the invention is provided, wherein both the phosphorus component release and the second solid-liquid separation described in the steps (3) and (4) are carried out in a single vessel. In accordance with this second aspect of the present invention, the scale of the apparatus scale is reduced, and simplified steps can be utilized, i.e., steps (3) and (4) are combined.

As the third aspect of the present invention, the method according to the above-described method in connection with the first or the second aspect of the invention is provided, further comprising a solubilization step (5) for solubilizing the secondary sludge following the step (4). Thus, in connection with the first or the second aspect of the invention, a further reduction in the amount of excess sludge is achieved.

As the fourth aspect of the present invention, the method according to the above-described method in connection with the third aspect of the invention is provided, wherein the solution resulting from the solubilization step (5) is returned to the aeration step (1) to be treated in a circulation system. Therefore, a sufficient reduction in the volume of the excess sludge can be realized, and production of the excess sludge can be close to zero, depending on the conditions employed.

The fifth aspect of the present invention is to provide the method according to the above-described method in connection with any of the above aspects of the invention, wherein at least a portion of the secondary sludge obtained from the steps (3) and (4) is returned to the aeration step (1). In this method, because the amount of the sludge which subjected to the phosphorus component release step in the step (3) can be adjusted regardless of the amount of the solution resulting from the solubilization step (5), it becomes possible to further increase the amount of the phosphorus components released from the sludge. Therefore, a biological degradation reaction of the sludge and accumulation of the phosphorus components in a microorganism by aeration step (1) can be accomplished more effectively.

As the sixth aspect of the present invention, the method according to the above-described method in connection with any of the above aspects of the invention is provided, further comprising a phosphorus component separation step (6). According to this method, the phosphorus components contained in the secondary treated liquid obtained from the steps (3) and (4) is easily concentrated and recovered in step (6). In step (6), for example, a flocculant is added to the secondary treated liquid phase, followed by precipitation and separation in order to recover the phosphorus components. The recovered phosphorus components can be readily utilized for producing fertilizers and phosphorus-based chemicals, and is advantageous in view of handling during conveyance.

As the seventh aspect of the present invention, the method according to the above-described method in connection with any of the above aspects of the invention is provided, further comprising an anaerobic treatment step (7) prior to the aeration step (1). In this method, anaerobic degradation of the sludge with the release of the phosphorus components to a liquid phase is carried out prior to an extensive incorporation of the phosphorus components into the microorganisms. Thereafter, the phosphorus components are incorporated more efficiently into the microorganisms in aeration step (1).

The eighth aspect of the present invention is to provide the method according to the above-described method in connection with any of the above aspects of the invention, wherein the phosphorus component release in step (3) is performed by exposing the primary sludge to anaerobic conditions. According to this method, release of the phosphorus components can be suitably accomplished with a high efficiency, which is advantageous in the treatment as a whole.

As the ninth aspect of the present invention, an apparatus for treating an organic waste water according to the above-described method, in connection with any of the above aspects of the invention, is provided. The apparatus comprises an aeration tank, a solid-liquid separation device, a phosphorus component release device, a solid-liquid separation device, and routes for transporting liquids and/or sludges connected with each tank. According to this aspect, the scale of the entire apparatus required for removing the phosphorus components can be comparatively reduced. Furthermore, the phosphorus components can be obtained in a concentrated form after the complete treatment, which enables reuse of the recovered phosphorus components.

The preferred embodiment for carrying out the present invention is described in more detail below. Nonlimiting preferred embodiments relating to the methods of the present invention are schematically shown in the flow sheets of FIGS. 1 to 3.

In the process shown in FIG. 1, raw waste water initially is subjected to an aeration step 1, in which aerobic microbial digestion and ingestion of the phosphorus components (namely, internal accumulation) by microorganisms can occur. Then, the mixture resulting from aeration step 1 is subjected to a solid-liquid separation step 2 for separation into a primary sludge (x) containing a high concentration of the phosphorus components and a primary treated liquid (a). For the purpose of releasing the phosphorus components from the microorganisms in primary sludge (x), steps 3 and 4 for phosphorus component release, as well as for the solid-liquid separation, is conducted. The phosphorus components can be released to a liquid phase, which is followed by the separation into a small volume of the treated liquid containing a large amount of the phosphorus components (designated as a secondary treated liquid (b)) and a secondary sludge (z). The volume of the resulting secondary treated liquid (b) in this process is substantially reduced compared to the phosphorus effluent obtained in a conventional treatment method. Consequently, the scale of the device for a phosphorus component separation step 6 can be relatively small. In step 6, for example, by addition of a flocculent to secondary treated liquid (b), the phosphorus components can be recovered as a solid component. Then, a tertiary treated liquid (c) containing substantially no phosphorus component, and a solid phosphorus component (y) are obtained by solid-liquid separation. While the solid phosphorus component (y) is separated from the sludge, the volume of the solid component (y) is greatly reduced with almost no other components derived from the raw waste water. Therefore, the solid phosphorus component can be readily utilized as the raw material for the production of fertilizers or phosphorus chemicals. The secondary sludge (z) is subjected to a solubilization step 5 to reduce the volume of the sludge. Subsequently, the solution resulting from solubilization step 5 is returned to aeration step 1 and subjected to a circulation system such that sufficient microbial digestion, as well as efficient concentration and recovery of the phosphorus components, are performed.

Figure 2:
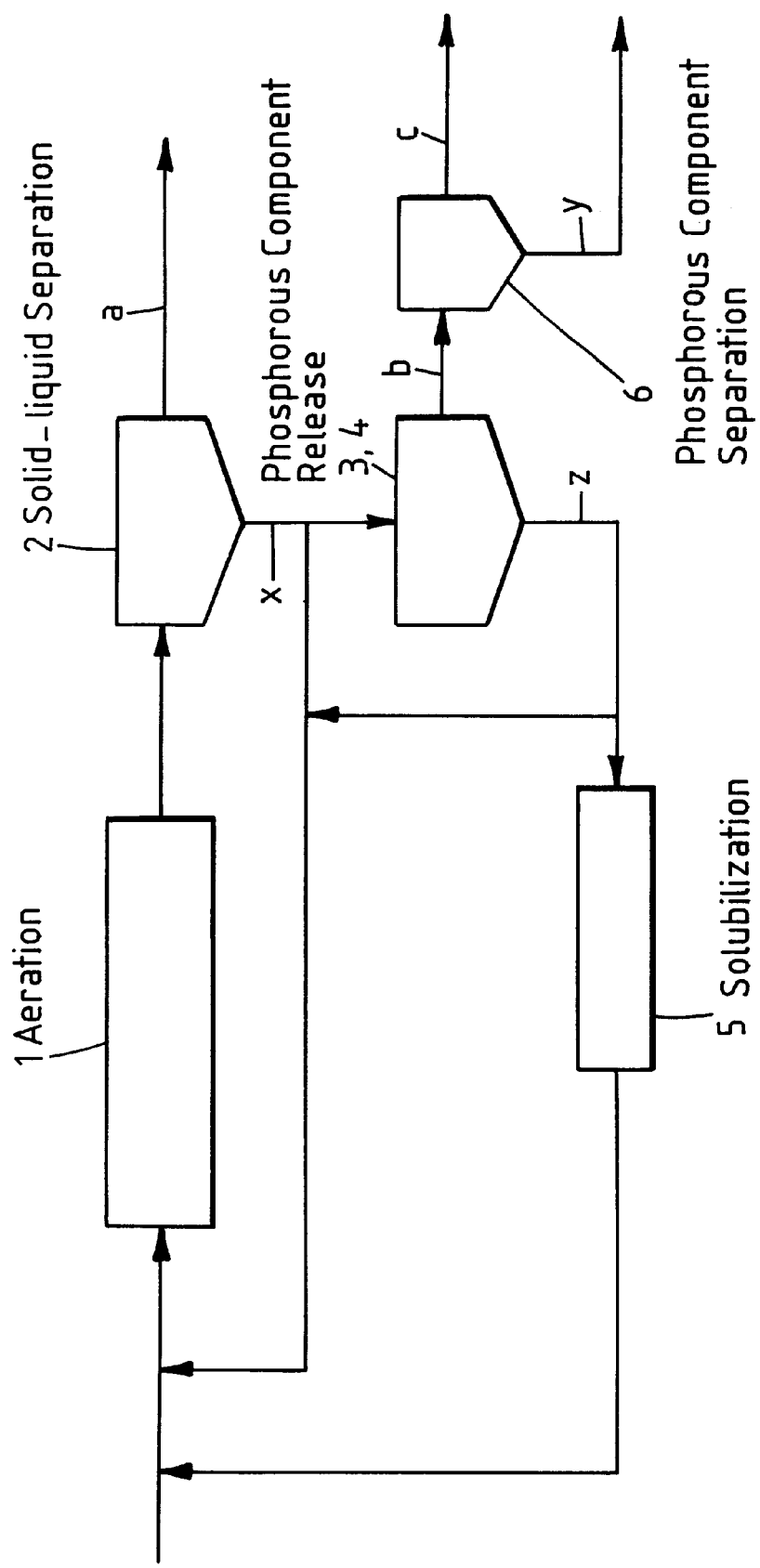
FIG. 2 is a schematic diagram showing another embodiment of the method of treating an organic waste water of the present invention.

Another embodiment of the present invention, shown in FIG. 2, comprises a route for returning a portion of secondary sludge (z) resulting from the phosphorus component release step, in addition to the embodiment shown in FIG. 1, into the aeration step 1. In this embodiment, it is envisioned that a further enhancement of the microbial digestion, i.e., the microbial internal accumulation of the phosphorus components and the following release of the phosphorus components, can be achieved.

Figure 3:
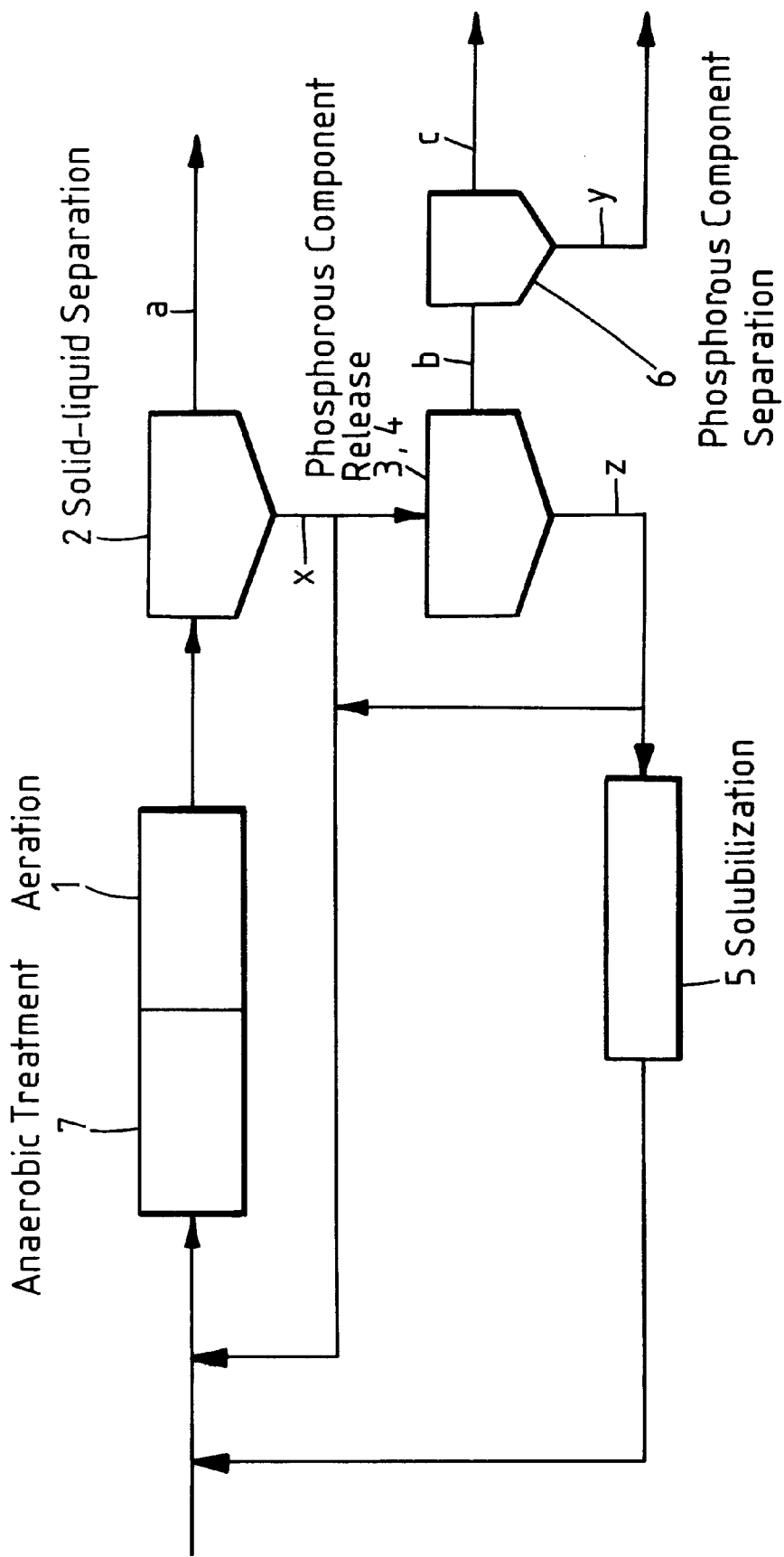
FIG. 3 is a schematic diagram showing another embodiment of the method for treating an organic waste water of the present invention.

The other preferred embodiment of the present invention, is shown in FIG. 3, wherein an anaerobic treatment step 7 is added prior to the aerobic treatment step 1 in the process shown in FIG. 2. In step 7, anaerobic digestion and release of phosphorus component from microorganisms contained in raw waste water, returned sludges (x and z), and the solution from solubilization step 5, occur simultaneously. Thus, aerobic digestion and accumulation of the phosphorus components into microorganisms in aeration step 1 can be promoted.

In the above-illustrated invention, the structure of tanks for each treatment in aeration step 1, solid-liquid separation step 2, and solubilization step 5, as well as routes for connecting such tanks, are not particularly limited. Therefore, tanks and routes which have been employed conventionally can be utilized in the present apparatus. Particularly, in the apparatus of the present invention, the tank for aeration treatment 1 preferably can be equipped with an aeration device, while a tank for anaerobic treatment step 7 described below preferably can be equipped with a stirring device. Furthermore, the respective conditions in these steps can be set according to the conventional means of the aerobic process, solid-liquid separation process, and solubilization process (see, Japanese Laid-Open Patent Publication No. 9-10791).

Briefly, aerobic digestion in step 1 is carried out at a room temperature with an aeration rate of 0.1 to 0.3 vvm. In the solid-liquid separation step 2, for example, precipitation, centrifugation and filtration (including membrane separation) can be utilized. Among these, precipitation or centrifugation is preferred because expensive devices and/or special care is not required. If separation by precipitation in a precipitation tank can be easily performed, precipitation is most suitable separation means. In step 5, solubilization can be performed at 50° C. to 90° C., preferably 60° C. to 70° C., under ambient pressure, and preferably at a neutral or weakly basic pH. The solubilization can be carried out either anaerobically or aerobically. Each step of the method of the present invention can be performed in any form of batch or continuous system. The time required for the treatment can be appropriately determined in view of the physical properties of waste water, as well as the scale of waste water and the scale of each tank employed.

In the phosphorus component release step 3 described above, it is particularly preferred that the phosphorus components can be released from the microorganisms in primary sludge (x) by exposing the sludge to anaerobic conditions. This process is constructed based on the following phenomenon. Orthophosphoric acid can be ingested by microorganisms under aerobic conditions (in the aeration step), whereas accumulated orthophosphoric acid, in a form of a granule of polyphosphoric acid in microbial cells, can be hydrolyzed and again released as orthophosphoric acid into a liquid phase under anaerobic conditions. Therefore, this process makes it possible to release the phosphorus components with high efficiency, and has the advantage of a simple treatment of the component after completion of the process.

When an anaerobic treatment is carried out as the phosphorus component release step 3, the temperature of the treatment is not particularly limited, and can be set at an ambient temperature. Furthermore, a phosphorus component release tank preferably is equipped with a stirring device so that the phosphorus component release is not inhibited by existing phosphorus components surrounding the microorganisms.

In addition to the anaerobic treatment described above, it is possible to release the phosphorus components accumulated in the microorganisms into a liquid phase using ultrasonic destruction, ozone degradation, cell destruction by a heat, alkali treatment, etc. Therefore, a convenient method can be appropriately selected depending on the species of the microorganism contained in the waste water.

The solid-liquid separation step 4 after the release of the phosphorus component in the step 3, can be carried out in a similar manner as separation step 2 described above.

In steps 3and 4, the phosphorus component release and the solid-liquid separation preferably are performed simultaneously in a single vessel. In this case, precipitation is suitable for the solid-liquid separation.

With respect to the phosphorus component separation step 6, a chemical flocculation method or crystallization dephosphorus method conventionally has been employed. Particularly, a chemical flocculation method, which comprises addition of flocculant and precipitation separation, is preferred. In more detail, flocculate precipitation can be carried out by adding a flocculant, such as polyaluminum chloride, aluminum sulfate, ferric chloride, or ferrous sulfate, to the secondary treated liquid (b), stirring the mixture, precipitating the resulting phosphorus components, and then recovering the phosphorus components as a solid.

Prior to addition of a flocculant, the total content of phosphorus components contained in treated liquid (b) can be determined (see Examples with respect to determination method of the total phosphorus content). Then, from the determined content of total phosphorus components, a mole number in terms of orthophosphoric acid can be estimated. The amount of flocculant added preferably can be equivalent to moles of those obtained above.

The phosphorus components finally are recovered as the secondary treated liquid (b) or the solid phosphorus component (y) which is highly concentrated and considerably purified. Therefore, it can be readily utilized as the raw material for the production of fertilizers or phosphorus chemicals as discussed above.

EXAMPLES

While examples of the present invention are described below, the scope of the present invention should not be limited thereto.

Example 1

According to the process shown in FIG. 1, a waste water from a food factory was subjected to the treatment. An aeration tank (a square-shaped vessel made of transparent vinyl chloride with an internal volume of 40 L) was charged with the waste water having 3,000 mg/L concentration of mixed liquid suspension solid (MLSS) at the flow rate of 20 L/day and maintained at aeration volume of 0.3 vvm at room temperature (25° C.). The following solid-liquid separation was carried out using a square-shaped precipitation vessel made of transparent vinyl chloride which has an internal volume of 10 L. The mixture from the aeration step was charged with 3,000 mg/L of MLSS concentration, then separated into a primary sludge and a primary treated liquid. The volume of the primary sludge discharged from this separation was 18.84 L per day. The resulting primary sludge then was subjected to an anaerobic treatment with 6,000 mg/L of MLSS concentration at a constant volume of 2.9 L/day, at 25° C. with stirring at 60 rpm in a phosphorus component release tank (square-shaped vessel made of transparent vinyl chloride with an internal volume of 10 L). A portion of the primary sludge, which was not subjected to phosphorus component release step, was returned to the aeration tank to maintain the loading amount of the phosphorus component release tank. A secondary sludge obtained by precipitation separation after the anaerobic treatment was transferred to a solubilization tank (cylindrical vessel made of glass with an internal volume of 2 L) with the MLSS concentration of 10,000 g/mL in order to solubilize at 1.74 L/day, at 65° C. with aeration volume of 0.5 vvm. According to this treatment, the sludge was solubilized in an amount of 5.8 g/day. On the other hand, a secondary treated liquid containing the phosphorus components, after the anaerobic treatment and precipitation, was subjected to flocculate precipitation at 1.16 L per day. In a flocculate precipitation tank (square-shaped vessel with an internal volume of 2 L), an equivalent number of moles of polyaluminum chloride to that in terms of orthophosphoric acid, which was converted from the content of total phosphorus in the secondary treated liquid, was added. Total phosphorus content was determined by the method described bellow. After flocculating the phosphorus components, the solid-liquid separation was carried out to obtain a tertiary treated liquid substantially containing no phosphorus component (1.16 L per day) and a solid phosphorus component. The whole process was continuously performed for 100 days in a circulation system.

Example 2

The treatment process shown in FIG. 3 also was performed in a similar system to that of Example 1, except that treatment in an anaerobic tank (square-shaped vessel made of transparent vinyl chloride with an internal volume of 20 L), as well as an aeration tank (internal volume of 20 L, the same as that of an anaerobic tank), was performed rather than treatment in the above 40 L aeration tank. The treatment in the anaerobic tank was performed at 25° C. with stirring at 60 rpm. The other conditions, including the discharged rate of the effluent or the sludge, were identical to those in the Example 1.

Comparative Example 1

According to the process shown in FIG. 4, a comparative experiment including aeration, solid-liquid separation, and solubilization was performed essentially identical with those in Example 1, except that the phosphorus component release step was omitted. In this comparative example, a primary treated liquid from the solid-liquid separation step was obtained in the volume of 20 L per day.

Estimation Tests

Water quality tests of each primary treated liquid obtained from each of the above examples were conducted with respect to the following items. The results of the tests are summarized in Table 1 below.

(1) BOD (determination of biological oxygen consumption): based on a dissolved oxygen amount which was consumed after a diluted solution was added and allowed to stand for 5 days at 20° C. in accordance with JIS K 0102.

(2) $COD_{Mn}$ (determination of chemical oxygen consumption): based on an oxygen consumption amount by addition of potassium permanganate at 100° C. in accordance with JIS K 0102.

(3) T-P (determination of the total amount of phosphorus): based on a peroxo potassium disulfide decomposition method in accordance with JIS K 0102.

(4) $PO_4^{-3}$-P (determination of an amount of phosphate ion): based on a molybdenum blue (ascorbic acid reduction) absorption method in accordance with JIS K 0102.

TABLE 1

|  | $BOD_5$ mg/L | $COD_{Mn}$ mg/L | T-P mg/L | $PO_4^{-3}$—P mg/L |
|---|---|---|---|---|
| Raw waste water | 320 | 257 | 10.9 | 8.5 |
| Comparative Example 1 | 15.5 | 30.0 | 8.9 | 9.2 |
| Example 1 | 11.0 | 28.5 | 6.2 | 5.5 |
| Example 2 | 13.8 | 31.0 | 2.5 | 0.7 |

As shown in Table 1, the total content of both phosphorus and phosphate ion in the primary treated liquid of Example 1 and 2 were significantly reduced as compared to that of the Example 1. Consequently, water quality was improved according to the method of the present invention. In particular, from the results of Example 2, wherein the anaerobic treatment step was additionally carried out, removal of the phosphorus components was sufficiently achieved. Therefore, it was concluded that phosphorus components can be recovered in a solid form, while the quality of the primary treated liquid was improved according to the method of the present invention.

Moreover, the flow rate of the influent into the flocculate precipitation step was 20 L per day in the conventional method, whereas, the corresponding flow rate in the method of the present invention was 1.16 L per day. Accordingly, it was found that the scale of a device required for phosphorus component separation step can be diminished substantially.

Consequently, there can be exerted such an effect that phosphorus components are separated and recovered in a small volume of liquid or solid form, according to the present invention. Therefore, reuse of the phosphorus components, and reduction of the phosphorus components contained both in a large amount of a primary treated liquid and in an excess sludge to be discharged outside, can be facilitated.

Furthermore, the production of excess sludge, which is essentially free of phosphorus components, in the present method is reduced. Accordingly, adverse affects on the environment associated with discarding excess sludge are reduced.

What is claimed is:

1. A method of treating an organic waste water comprising the steps of:

(1) aerobically treating a waste water in an aeration step;

(2) solid-liquid separating a treated waste water after the aeration step into a primary treated liquid and a primary sludge;

(3) releasing phosphorus components from the primary sludge to a liquid phase in a phosphorus component release step which is performed by a process selected from the group consisting of exposing the primary sludge to anaerobic conditions, ultrasonic destruction, and cell destruction by a heat and alkali treatment; and (4) performing a second solid-liquid separation step to separate the primary sludge into a secondary treated liquid containing the released phosphorus components and a secondary sludge that is substantially free of phosphorus components; and (5) solubilizing the secondary sludge in a solubilization step.

2. The method according to claim 1, wherein both the phosphorus component release and the second solid-liquid separation described in the steps (3) and (4) are performed in a single vessel.

3. The method according to claim 1, wherein the solution resulting from the solubilization step (5) is returned to aeration step (1) for treatment.

4. The method according to claim 1, wherein at least a portion of the secondary sludge obtained from step (4) is returned to the aeration step (1).

5. The method according to claim 1, further comprising a phosphorus component separation step (6), wherein the phosphorus components contained in the secondary treated liquid are concentrated and recovered.

6. The method according to claim 1, further comprising anaerobically treating the waste water in an anaerobic treatment step (7) prior to aeration step (1).

7. The method according to claim 1, wherein the phosphorus component release step in step (3) is performed by exposing the primary sludge to anaerobic conditions.

8. An apparatus for treating an organic waste water according to the method of claim 1, comprising an aeration tank, a solid-liquid separation device, a phosphorus component release device, a second solid-liquid separation device, a solubilization vessel, and routes for transporting a liquid and/or a sludge in connection with each tank.

* * * * *